United States Patent
Remla et al.

(10) Patent No.: US 12,248,761 B2
(45) Date of Patent: Mar. 11, 2025

(54) DETERMINISTIC RESET MECHANISM FOR ASYNCHRONOUS GEARBOX FIFOs FOR PREDICTABLE LATENCY

(71) Applicant: XILINX, INC., San Jose, CA (US)

(72) Inventors: Riyas Noorudeen Remla, Singapore (SG); Warren E. Cory, Redwood City, CA (US)

(73) Assignee: XILINX, INC., San Jose, CA (US)

( * ) Notice: Subject to any disclaimer, the term of this patent is extended or adjusted under 35 U.S.C. 154(b) by 70 days.

(21) Appl. No.: 18/129,762

(22) Filed: Mar. 31, 2023

(65) Prior Publication Data
US 2024/0329924 A1    Oct. 3, 2024

(51) Int. Cl.
G06F 5/06    (2006.01)
G06F 1/10    (2006.01)

(52) U.S. Cl.
CPC . *G06F 5/06* (2013.01); *G06F 1/10* (2013.01)

(58) Field of Classification Search
CPC .......................................................... G06F 5/06
See application file for complete search history.

(56) References Cited

U.S. PATENT DOCUMENTS

| | | | |
|---|---|---|---|
| 7,310,396 B1 * | 12/2007 | Sabih | H04L 7/005 375/372 |
| 10,038,450 B1 | 7/2018 | Cory | |
| 2013/0254583 A1 * | 9/2013 | Rifani | G06F 1/12 713/400 |
| 2016/0226655 A1 * | 8/2016 | Mu | G06F 5/06 |
| 2021/0367908 A1 * | 11/2021 | Sharma | G06F 5/16 |

OTHER PUBLICATIONS

Altera Corporation, "Implementing Deterministic Latency for CPRI and OBSAI Protocols in Altera Devices," Dec. 2016, 18 pgs, https://www.intel.com/content/dam/www/programmable/us/en/pdfs/literature/an/an610.pdf.

* cited by examiner

*Primary Examiner* — David E Martinez
(74) *Attorney, Agent, or Firm* — Patterson + Sheridan, LLP

(57) ABSTRACT

Embodiments herein describe a solution for deterministic de-assertion of write and read resets of an asynchronous gearbox FIFO having unequal write and read data bit widths. Proposed approaches look for a stable region between read and write clock phases by sweeping one of the clock phases until the leading edges (phases) of both clocks are aligned then releasing the write and read resets deterministically based upon a change in cyclic behavior of detected logic levels of a reset beacon waveform.

18 Claims, 10 Drawing Sheets

DETERMINISTIC RESET MECHANISM FOR ASYNCHRONOUS GEARBOX FIFOs FOR PREDICTABLE LATENCY

TECHNICAL FIELD

Embodiments of the present disclosure generally relate to asynchronous gearbox first-in first-out (FIFO)s with unequal read and write data bit widths, and, more specifically, for predictable data transfer latency using deterministic reset latency over multiple resets.

BACKGROUND

Asynchronous FIFOs allow transfer between clock domains and storage of data until data processing is ready for its use. The asynchronous FIFO can support clock domain crossing at the same or different clock rates and data bus widths. The asynchronous FIFOs may use full and empty flags to prevent data overflow and underflow and expansion logic to allow for unlimited expansion capability in both word size and depth. Combining parallel asynchronous FIFOs allows various word sizes while serial asynchronous FIFO communication simplifies data transfer.

A gearbox FIFO is a component which allows conversion of one data bus width to another from input to output. Data of width M, written to the gearbox FIFO, can be read, depending on a configuration, as N width vectors, where M is not equal to N. The ratio M:N provides the rate of read and write clocking required for the data bus width change and transfer between data input write and data output read if the FIFO is to be written and read continuously. Gearbox FIFOs may use three types of clocking and rate modes. 1) Using the same clock on both write and read sides. Since the write and read data widths differ, this type of clocking implies that writing of data and/or reading of data will not occur continuously. Occasional breaks in reading or writing are required to equalize the FIFO's input and output data rates. 2) Using asynchronous clocks with unknown phase relationship, where the rates of the clocks match the required data bus width change. If the ratio of write and read clock periods matches the ratio of write and read data widths, then data may be written into and read from the gearbox FIFO continuously without overflow or underflow. For example, if the write data is 64 bits wide with a write clock period of 1.6 ns (625 MHz), and the read data is 40 bits wide with a read clock period of 1.0 ns (1 GHz), then data is written in and read from the FIFO at identical data rates of 40 Gbps, and the FIFO may be written and read continuously. 3) Like (2), but with a known (though varying) phase relationship between the write and read clocks. For example, it may be known that at specific times, the rising edges of the write and read clocks are aligned. The example above for type (2) applies for (3) as well. Asynchronous gearbox FIFOs are gearbox FIFOs using clocking type (2) or (3) and intended for continuous writing and reading of data. The present disclosure applies to asynchronous gearbox FIFOs using clocking type (2).

SUMMARY

In one example of the disclosure, a method for deterministic de-assertion of write and read resets of an asynchronous gearbox FIFO having unequal write and read data bit widths includes providing first and second clocks that are harmonically related in frequency. Deriving a reset beacon waveform from the first clock. Deriving a third clock from the second clock. Sampling logic level values of the reset beacon waveform at each logic level change from a first logic level to a second logic level of the third clock, while adjusting a phase of the third clock frequency. Observing cyclical behavior of the logic level values sampled. If a change in the cyclical behavior of the logic level values is detected, then de-assert write and read resets after a first interval. If no change in the cyclical behavior of the logic level values is detected, then continue adjusting the phase of the third clock frequency.

In one example of the disclosure, a method for deterministic de-assertion of write and read resets of an asynchronous gearbox FIFO having unequal write and read data bit widths includes providing first and second clocks that are harmonically related in frequency. Deriving a reset beacon waveform from the first clock. Deriving a third clock from the second clock. Sampling logic level values of the reset beacon waveform at each logic level change from a first logic level to a second logic level of the third clock, while adjusting a phase of the third clock frequency. Shifting the sampled logic level values of the reset beacon waveform through an S-bit shift register. If the most significant bit and the least significant bit of the S-bit shift register word are at different logic level values then de-assert the write and read resets. If the most significant bit and the least significant bit of the S-bit shift register word are at the same logic level values then continue adjusting the phase of the third clock frequency, sampling the logic level values of the reset beacon waveform and shifting the sampled logic level values into the S-bit shift register.

In one example of the disclosure, an apparatus for deterministic reset of an asynchronous gearbox first-in first-out (FIFO) includes an input FIFO having a data bit width M, a write clock input and a write reset input, and is adapted to receive data of bit width M. An output FIFO having a data bit width N, a read clock input and a read reset input, and is adapted to transmit the receive data of bit width M at a bit width N. First and second frequency dividers having inputs coupled to a reference clock, and an output of the first frequency divider coupled to the write clock input of the input FIFO. A beacon generator and sampler having a write clock input coupled to the output of the first frequency divider, a sampled reset output, and a reset beacon output. A phase and reset controller having a write clock input coupled to the output of the first frequency divider, a sampled reset input coupled to the sampled reset output of the beacon generator, a reset beacon input coupled to the reset beacon output of the beacon generator, a write reset output, a read reset output, and a phase code output. A phase interpolator having a phase code input coupled to the phase code output of the phase and reset controller, an input coupled to an output of the second frequency divider, and a read clock output having a frequency derived from the output of the second frequency divider. The read clock output from the phase interpolator is coupled to read clock inputs of the beacon generator and sampler, the phase and reset controller, and the output FIFO. The phase interpolator varies a phase of the read clock frequency based upon values from the phase code output of the phase and reset controller until the write and read clocks are substantially in phase.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
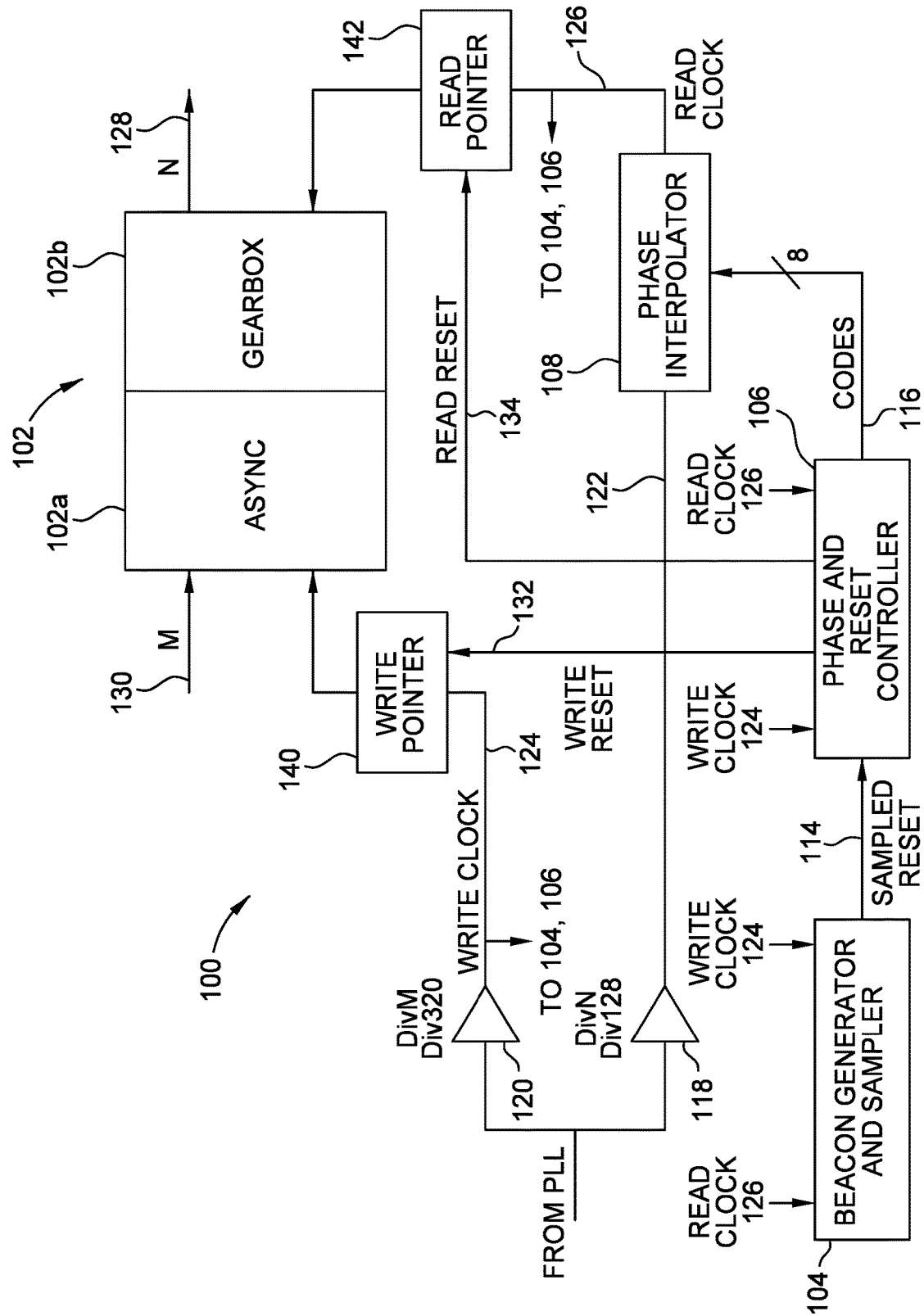
FIG. 1 illustrates a schematic block diagram of an asynchronous gearbox FIFO having a deterministic reset release, according to an example.

To facilitate understanding, identical reference numerals have been used, where possible, to designate identical elements that are common to the figures, and a lower-case letter added where the elements are substantially the same. It is contemplated and within the scope of this disclosure that elements of one embodiment may be beneficially incorporated into other embodiments.

DETAILED DESCRIPTION

Figure 9:
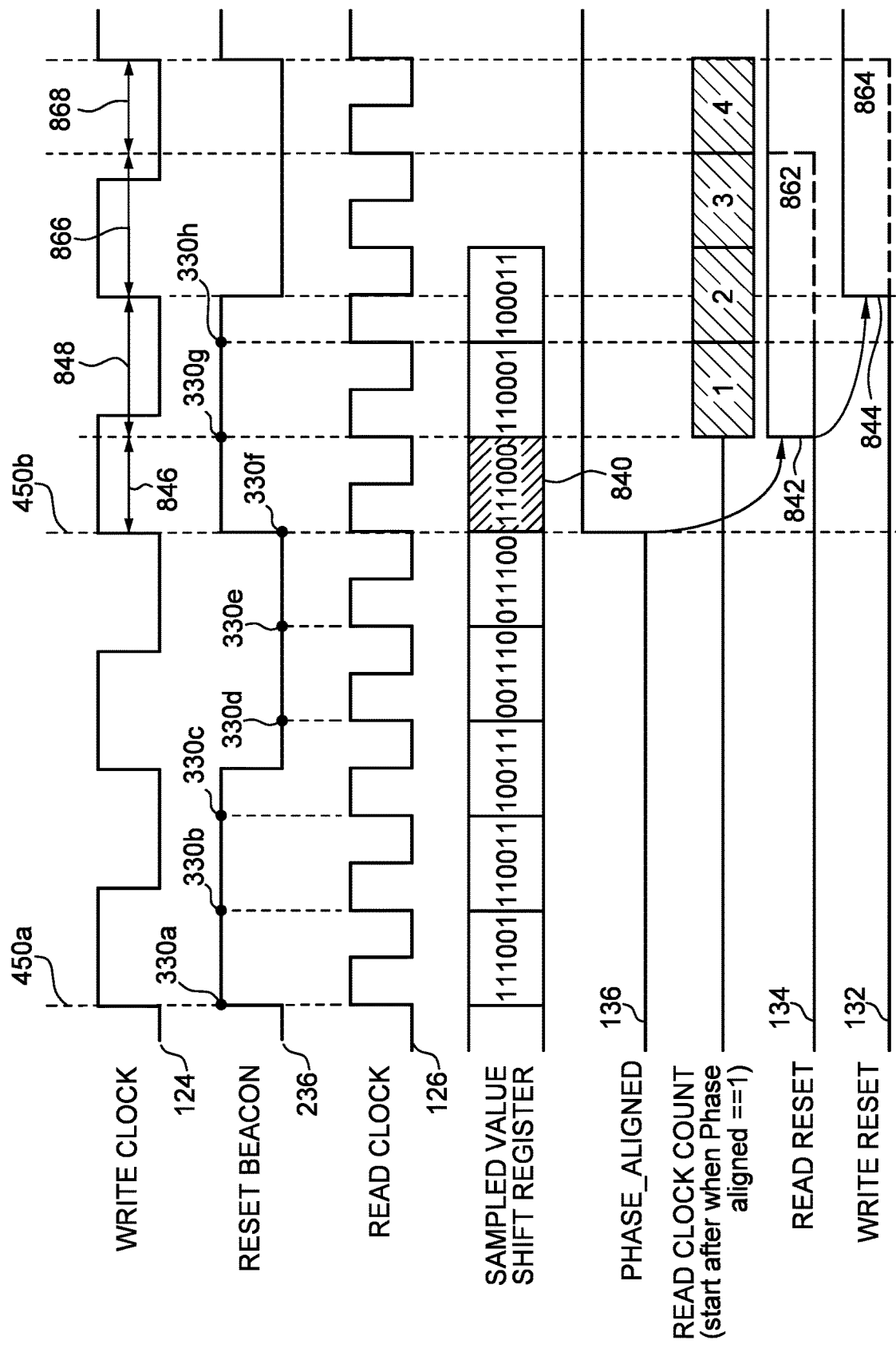
FIG. 9 illustrates a schematic timing diagram of a meta-stable state where the read and write clock rising edges are aligned, according to an example.
Figure 10:
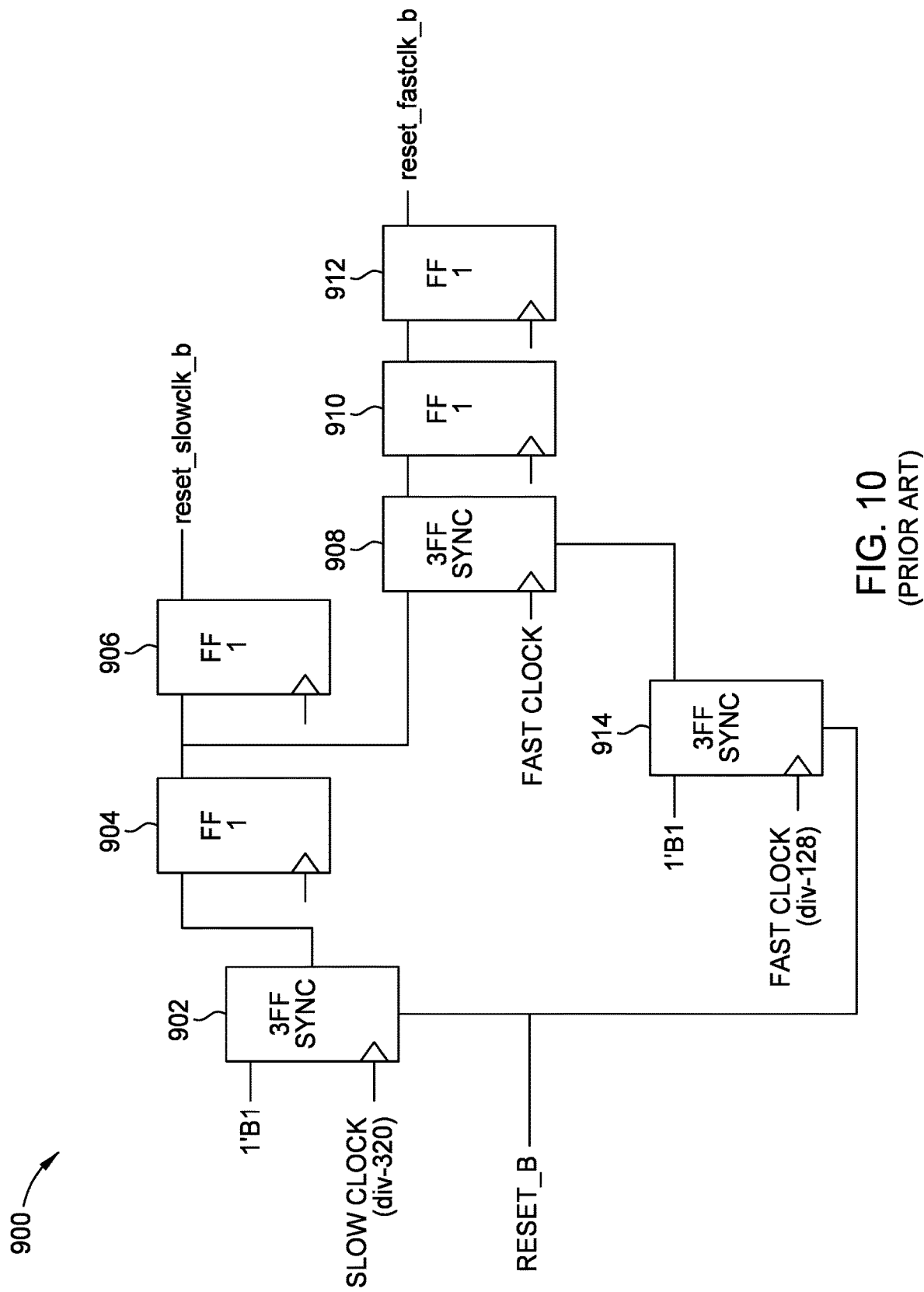
FIG. 10 illustrates a schematic block diagram of a prior art asynchronous gearbox FIFO.

Prior technique for controlling asynchronous gearbox FIFO write and read resets through a synchronizer is shown in FIG. 9. Due to the presence of synchronizers in the write and read reset paths, there always will be a latency variation of a maximum of one (1) cycle of the fast clock, in addition, the phase difference between the write and read clocks cannot be controlled. A method, system and apparatus for minimizing the latency variation in phase between the write and read clocks is disclosed hereinafter and for keeping gearbox FIFO write and read resets de-asserted until a fixed phase relationship, having a minimum phase difference, has been established between the read and write clocks of the asynchronous gearbox FIFO. Clock Phase(s) may be adjusted in such a way that there are enough setup and hold times established for safe transfer of reset from one clock domain to another.

Deterministic detection is utilized for finding when a phase difference between the write and read clocks is minimal. The write clock may be slower or faster than the read clock, depending upon the data write (data input to FIFO) and data read (data output from FIFO) bit widths being transferred there between. The phase of either the faster or slower clock may be adjusted while detecting a time at which edges of both clocks have a known alignment. To carry out this detection, one clock may sample (record the values of) the other clock continually, resulting in a sequence of sampled values. Alternatively, one clock may generate a toggling beacon, inverting its value on each rising clock edge or each falling clock edge. The beacon is sampled by the other clock, again resulting in a sequence of sampled values. In this case, the beacon may represent a reset signal that may change value first in one clock domain and then be copied to the other clock domain, similarly to the beacon. If all clock or beacon sampled values are captured with reliable timing (setup/hold constraints satisfied), the sequence of sampled values will show a repeatable patter depending on the clock frequencies. For example, the pattern may consist of 3 high sample values followed by 2 low values. As one clock phase is shifted relative to the other, the sample pattern will eventually be distorted or shifted. Using the example of 3 high values followed by 2 low values, the detector may look for a time when the pattern changes to 3 high values followed by 3 low values, or 2 high values followed to 2 low values. Alternatively, the detector may record the 5 most recent samples in a shift register, and find a point where the newest sample does not match the fifth most recent sample, indicating a change in the sample pattern. This indicates close alignment between the sampling edge of the sampling clock and a transition in the sampled signal (e.g., the other clock, or the beacon generated by the other clock). Once a stable minimum phase difference between the write and read clocks of the asynchronous gearbox FIFO (or between sampling clock and beacon) has been established, the write and read resets may be de-asserted for the asynchronous gearbox FIFO. Knowledge of the phase relationship between the clocks, as determined by this process, is used to time the reset de-assertions such that they occur with reliable timing in both clock domains.

A stable region between the read and write clocks is determined by sweeping (adjusting) one of the clock phases (either the faster or slower clock) until a minimal phase difference is deterministically detected, and then de-asserting the write and read resets. This achieves a predictable latency for the data path across multiple resets. Protocols such as CPRI, JESD and OBSAI-RP03-1 have stringent requirements for predictable latency across multiple resets/power ups. This is useful for PCIe applications as well, which have stringent serial lane skew requirements at higher data rates.

Embodiments herein provide for using a deterministic reset latency for aligning write and read clocks for data paths of asynchronous gearbox FIFOs or phase compensation FIFOs. Latency through the asynchronous gearbox FIFOs or phase compensation FIFOs vary over multiple resets. A proposed method for making this latency deterministic over multiple resets is disclosed hereinafter. Accurate latency measurements for data paths include asynchronous gearbox FIFOs or phase compensation FIFOs. Reduced skew between serial lanes of multilane protocols is achieved and latency of data path(s) remain constant.

Various features are described hereinafter with reference to the drawing figures. It should be noted that the drawing figures may or may not be drawn to scale and that the elements of similar structures or functions are represented by like reference numerals throughout the drawing figures. It should be noted that the drawing figures are only intended to facilitate the description of the features. They are not intended as an exhaustive description of the examples below or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Referring now to the drawing figures, the details of example embodiments are schematically illustrated. Like elements in the drawing figures will be represented by like numbers, and similar elements will be represented by like numbers with a different lower-case letter suffix.

Referring to FIG. 1, depicted is a schematic block diagram of an asynchronous gearbox FIFO having a deterministic reset release, according to an example. The asynchronous gearbox FIFO having a deterministic reset release, generally represented by the numeral 100, may comprise a FIFO 102 having a write portion 102a and a read portion 102b, a beacon generator and sampler 104, a phase and reset controller 106 and a phase interpolator 108. A high frequency clock source from, for example but not limited to, a phase-locked-loop (PLL) oscillator may be divided in frequency to a first (e.g., write) clock 124 and a second clock 122. In the example shown in FIG. 1, the frequency of the write clock 124 may be lower than the frequency of the second clock 122 by a factor of 2.5:1 or 5:2 (320:128). The clock frequencies may be selected using the write data 130 having a bit width of 320 bits and the read data 128 having a bit width of 128 bits, stored in the write portion 102a (input) and read portion 102b (output) of the FIFO 102, respectively. If the write data 130 bit width is 2.5 times the read data 128 bit width, then the second clock 122 must be 2.5 times faster than the first clock 124. A more general relationship exists where the write data 130 bit width is M and the read data 128 bit width is N, and the second clock 122 frequency would be M/N times the write clock 124 frequency. If the write data 130 bit width M is less than the read data 128 bit width N then the clock speeds are reversed, wherein the higher data bit width side of the FIFO 102 (i.e., read portion 102b) would have the read clock 126 frequency slower than the write clock 124 frequency. Therefore, different write and read data bit widths would require different write and read clock frequencies (speeds).

When the write reset 132 is de-asserted, the write clock 124 will load the write data 130 into the write portion 102a of the FIFO 102. When the read reset 134 is de-asserted, the read clock 126 will output the read data 128 from the read portion 102b of FIFO 102. The write reset 132 and the read reset 134 are controlled by the phase and reset controller 108. The phase and reset controller 108 also sends clock phase adjustment codes 116 to the phase interpolator 108 for shifting the phase of the read clock 126 (derived from the second clock 122) until the desired alignment between the clocks is achieved. It is contemplated and within the scope of this disclosure that the write clock 124 may be phase shifted instead of the read clock 126. The phase adjustment codes 116 may be generated with a modulo-N counter that is used to adjust the phase of a rising edge of either the read (fast) clock 126 or the write (slow) clock 124 so as to align the clocks 124 and 126, as more fully described hereinafter. Note the write clock can be faster or slower than the read clock depending upon the relationship between the bit widths of the input (write) and output (read) portions of the FIFO 102.

Figure 2:
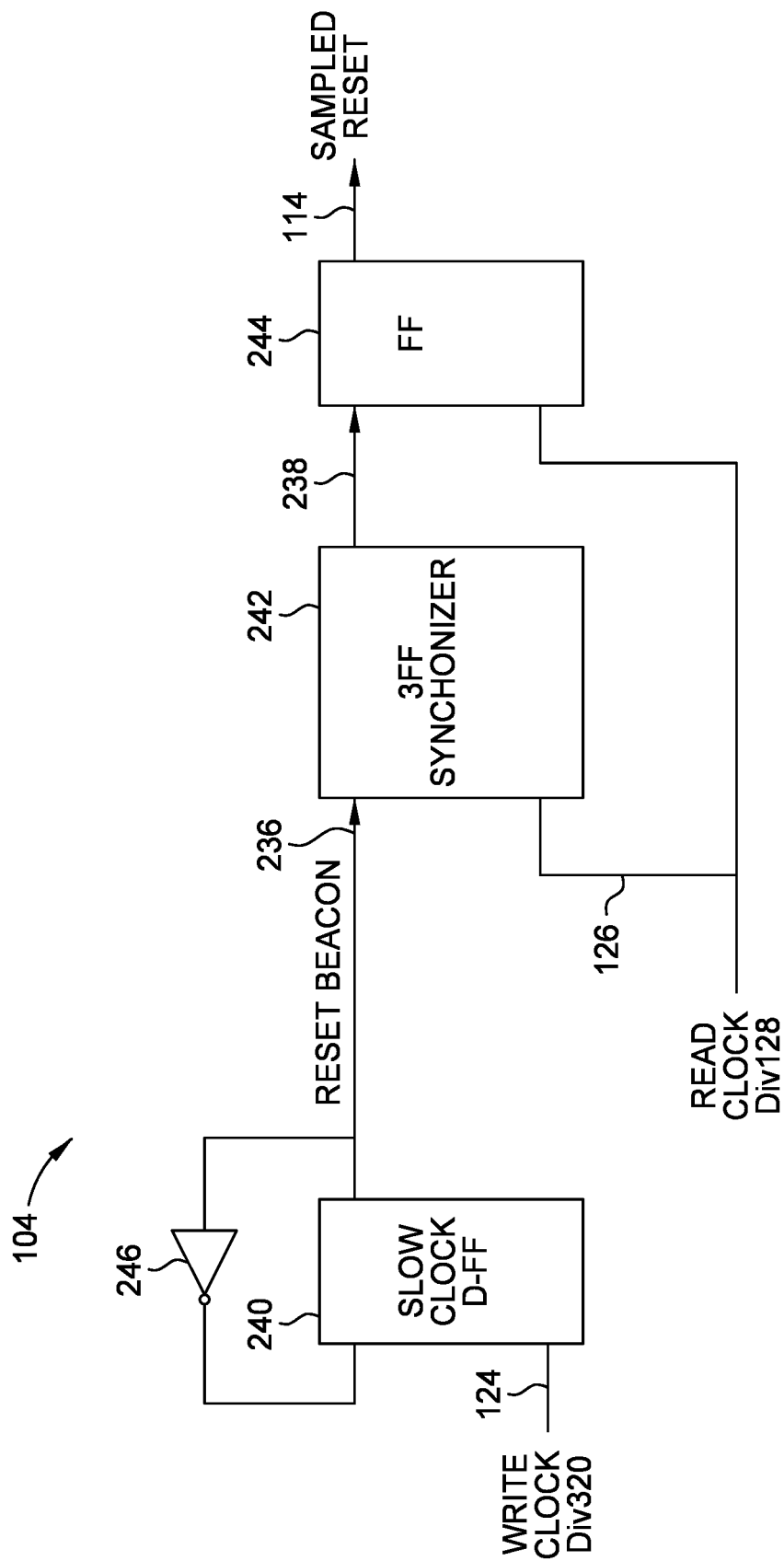
FIG. 2 illustrates a more detailed schematic block diagram of the beacon generator and sampler of FIG. 1.

Referring to FIG. 2, depicted is a more detailed schematic block diagram of the beacon generator and sampler of FIG. 1. The beacon generator, generally represented by the numeral 104, may comprise a divide-by-two circuit (e.g., D flip-flop 240 and inverter 246), a synchronizer 242 and a sampled reset circuit 244. Either clock 124, 126 may be coupled to this divide by two circuit which then generates a reset beacon waveform 236 that is half the frequency of the input clock 124 or 126. The remaining clock may be coupled to the clock input of the synchronizer 242. Direction of beacon transfer preferably is the same as the direction of reset transfer, since the beacon transfer timing is representative of the reset transfer timing. Alternatively, the divide-by-two circuit may be omitted, and the sampling clock (either clock 124 or 126) may sample the other clock directly. The read (fast) clock 126 drives the synchronizer 242 and the sampled reset circuit 244 to generate a sampled reset 114 which is coupled to the phase and reset controller 106

Figure 3:
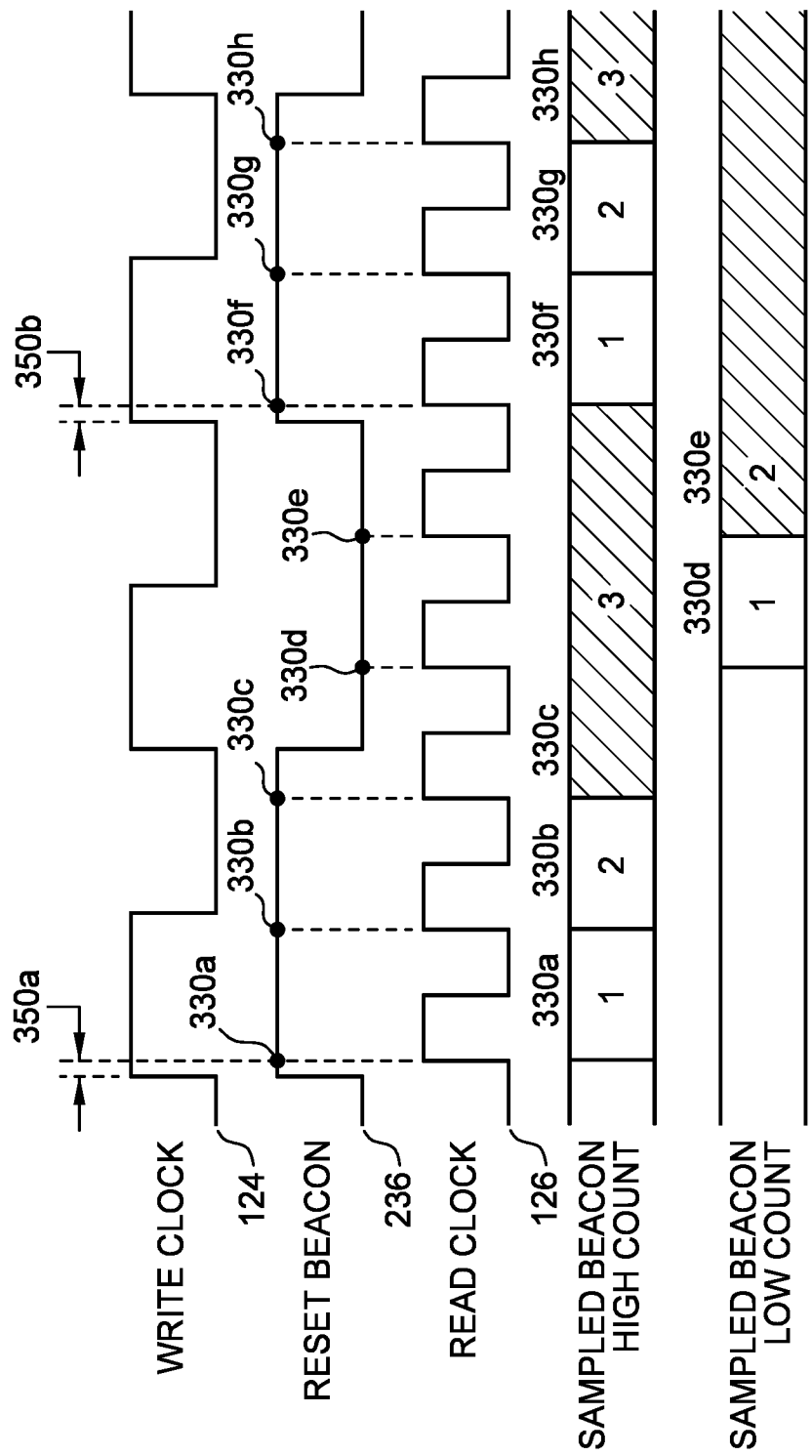
FIG. 3 illustrates a schematic timing diagram of read and write clocks having rising edges not aligned, according to an example.

Referring to FIG. 3, depicted is a schematic timing diagram of read and write clocks having rising edges not aligned, according to an example. The phase and reset controller 106 has three inputs: 1) write clock 124, 2) read clock 126 and 3) sampled reset 114; and three outputs: 1) write reset 132, 2) read reset 134 and 3) fast clock phase adjustment codes 116. The write clock 124 frequency and phase remain constant, as does the reset beacon waveform 236 which is derived from the write clock 124 through the divide-by-two circuit 240, 246. The reset beacon waveform 236 is one-half the frequency of the write clock 124. The rising edges of the write clock 124 and the reset beacon waveform 236 are substantially aligned.

The rising edge of the read clock 126 waveform is used to trigger the sampled reset 114 for taking logic level samples 330 of the reset beacon waveform 236. The sampled reset 114 is generated in the synchronizer 242 and the sampled reset circuit 244 from the read clock 126. The sampled reset 114 is slightly delayed in time and will take logic level samples 330 of the reset beacon waveform 236 slightly after each rising edge of the read clock 126.

In the timing diagram shown in FIG. 3, the rising edges of the write clock 124 and read clock 126 do not align by a phase difference of 350. The phase and reset controller 106 counts the high and low logic level values of the reset beacon waveform 236 at each rising edge of read clock 126, represented by samples 330. The Sampled Beacon High Count ("high count") records the number of consecutive high samples. When a low sample is seen, the high count will start over from 1 at the next high sample. Similarly, the Sampled Beacon Low Count ("low count") records the number of consecutive low samples. When a high sample is seen, the low count will start over from 1 at the next low sample. In FIG. 3, the high count reaches 3 while the low count reaches 2. This pattern is designated as (3,2) herein, i.e., 3 high samples and 2 low samples. The periodic nature of these high and low logic level sample values determines whether both clock edges of the write and read clocks 124, 126 are aligned, or they are undesirably apart in phase. When both clock edge (phases) are not aligned, sampled reset 114 counts follow (3,2), (3,2), etc., sequence for both high and low logic level sample counts per one cycle of the reset beacon waveform 236. For example, three high logic level samples 330a, 330b, 330c and two low logic level samples 330d. 330e during one reset beacon waveform cycle. The start of the next reset beacon waveform cycle has three high logic level samples 330f, 330g, 330h, but only two low logic level samples 330 (not shown). Alternatively, the pattern may be (2,3), (2,3), etc., which would be the case in FIG. 3 if the reset beacon were inverted.

Figure 4:
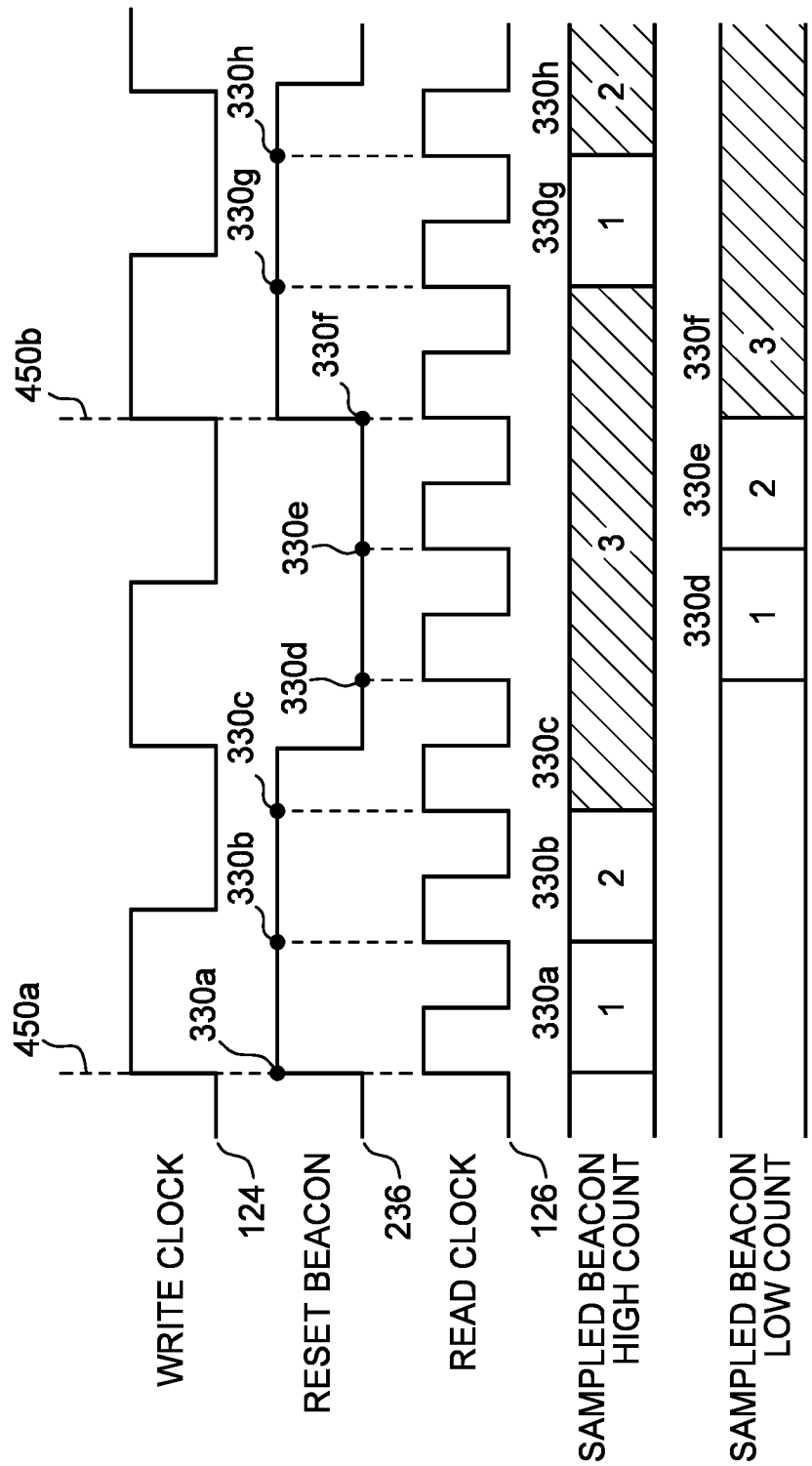
FIG. 4 illustrates a schematic timing diagram of read and write clocks having rising edges aligned, according to an example.

Referring to FIG. 4, depicted is a schematic timing diagram of read and write clocks having rising edges aligned, according to an example. The read clock 126 is supplied to the asynchronous gearbox FIFO 102 through the phase interpolator 108 which can shift the phase of the read (fast) clock 126 in one or both directions, plus or minus in time. When the write (slow) clock 124 and the read (fast) clock 126 phases are not aligned, the read (fast) clock 126 or the write (slow) clock 124 may be phase shifted until the high and low sample 330 counts give identical values. Either (3,3) or (2,2), etc. This shows that at least one of the samples 330a, 330f are in a metastable state and both clock rising edges are aligned. The distorted sequence (3,3) or (2,2) may appear only once, or it may occur repeatedly, according to whether the shifted clock achieves a metastable alignment for some sampling location, such as 450a and 450b in FIG. 4. FIG. 4 shows the logic waveforms for aligned phases of both clocks 124,126.

In the timing diagram shown in FIG. 4, the write clock 124 generates the reset beacon 236, while read clock 126 samples it. For conceptual simplicity, the waveforms do not take into account that the beacon sampling logic will commonly synchronize the beacon through multiple flip-flops to reduce the likelihood of propagating metastability in the sampling logic. The rising edges of the write clock 124 and read clock 126 align at points 450. The phase and reset controller 106 counts the high and low logic level values of the reset beacon waveform 236 waveform at each rising edge of the sampling clock 126, represented by samples 330. The periodic nature of these high and low sample values decide whether both clock edges of the write and read clocks 124, 126 are aligned, or they are undesirably apart in phase. When both clock edge (phases) are aligned, sampled beacon counts (3,3) or (2,2) sequence for both high and low logic level sample counts will occur one time or more as previously described. For example, three high logic level samples 330a, 330b, 330c and three low logic level samples 330d, 330e, 330f during one reset beacon waveform 236 cycle indicate phase alignment of the write and read clocks 124, 126. Depending on circuit characteristics such as the size of phase adjustments by the controller 106 and jitter, a (3,3) or (2,2) sequence may occur intermittently for a particular phase setting, or a (3,3) or (2,2) sequence may be observed just once after a phase change, indicating that the metastable phase alignment has been passed. In this latter case, it may be considered that phase alignment has been found (to be within the possible alignment precision).

The high count and low count patterns that occur when the write clock and read clock do not align ((3,2) in FIG. 3), and the patterns that occur if there is metastability at some beacon sampling points (330a and 330f in FIG. 4, with resulting sample count pattern (3,3) are characteristic of the relative frequencies of the two clocks (5:2 in FIGS. 3 and 4). For different relative frequencies, different patterns may be determined.

Figure 5:
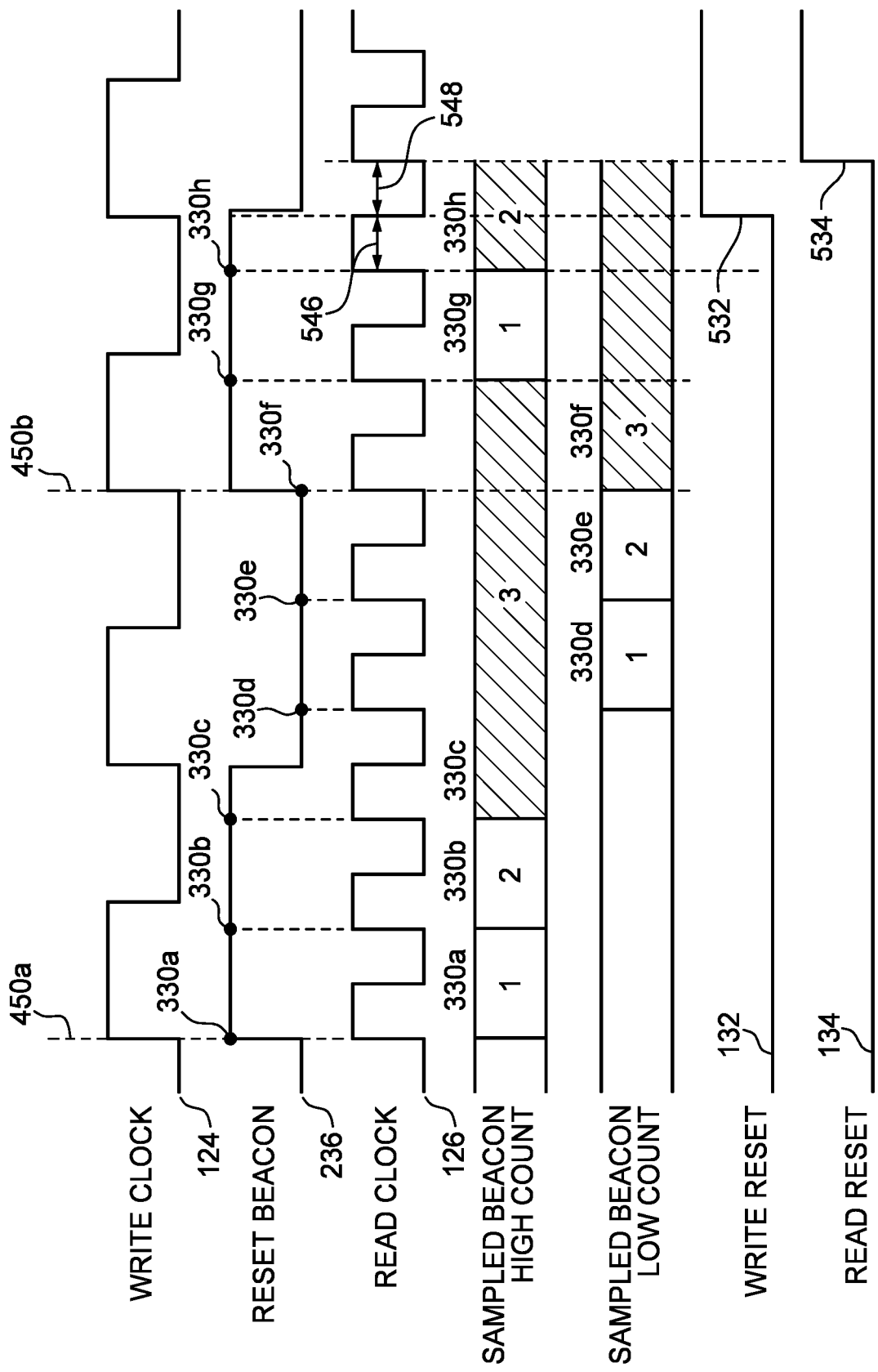
FIG. 5 illustrates a schematic timing diagram for FIFO write and read reset de-assertions, according to an example.

Referring to FIG. 5, depicted is a schematic timing diagram for FIFO write and read reset de-assertions, according to an example. When the sample 330 counts of both the low and high logic levels of the reset beacon waveform 236 are equal (either [2,2] or [3,3]) an assumption can be made that the rising edges of the write and read clocks 124, 126 are aligned, and that occurrence may be used to generate the write reset 132 de-assertion at time point 532. The write reset 132 after time point 532 may be synchronized to a rising edge of the read clock 126 to generate the read reset 134 at time point 534 which occurs on the next leading edge (next cycle) of the read clock 126, as shown in FIG. 5. This ensures that both of the write and read resets 132 and 134 occur at the same phase. The write and read reset de-assertion timing points 532, 534 are shown in relation to the timing of the other waveforms of FIG. 5. The setup window 548 and hold window 546 for transition 532 with respect to the read clock 126 are both nominally one-half (½) of a read clock cycle. Read and write resets are shown "active low" (active reset is low; de-asserted reset is high) but can also be "active high" (active reset is high; de-asserted reset is low) and are contemplated herein.

The phase interpolator 108 shifts the phase of the read clock 126, for example but is not limited to, by a phase step size of period/128 for 7-bit codes 116. The phase and reset controller 106 maintains the sampled 330 counts of the low and high logic levels determined from the sampled reset beacon waveform 236. Samples 330 of these low and high logic levels are compared and used to generate an edge alignment "Done" and de-assert the write reset 132 and read reset 134 to the asynchronous gearbox FIFO 102.

Figure 6:
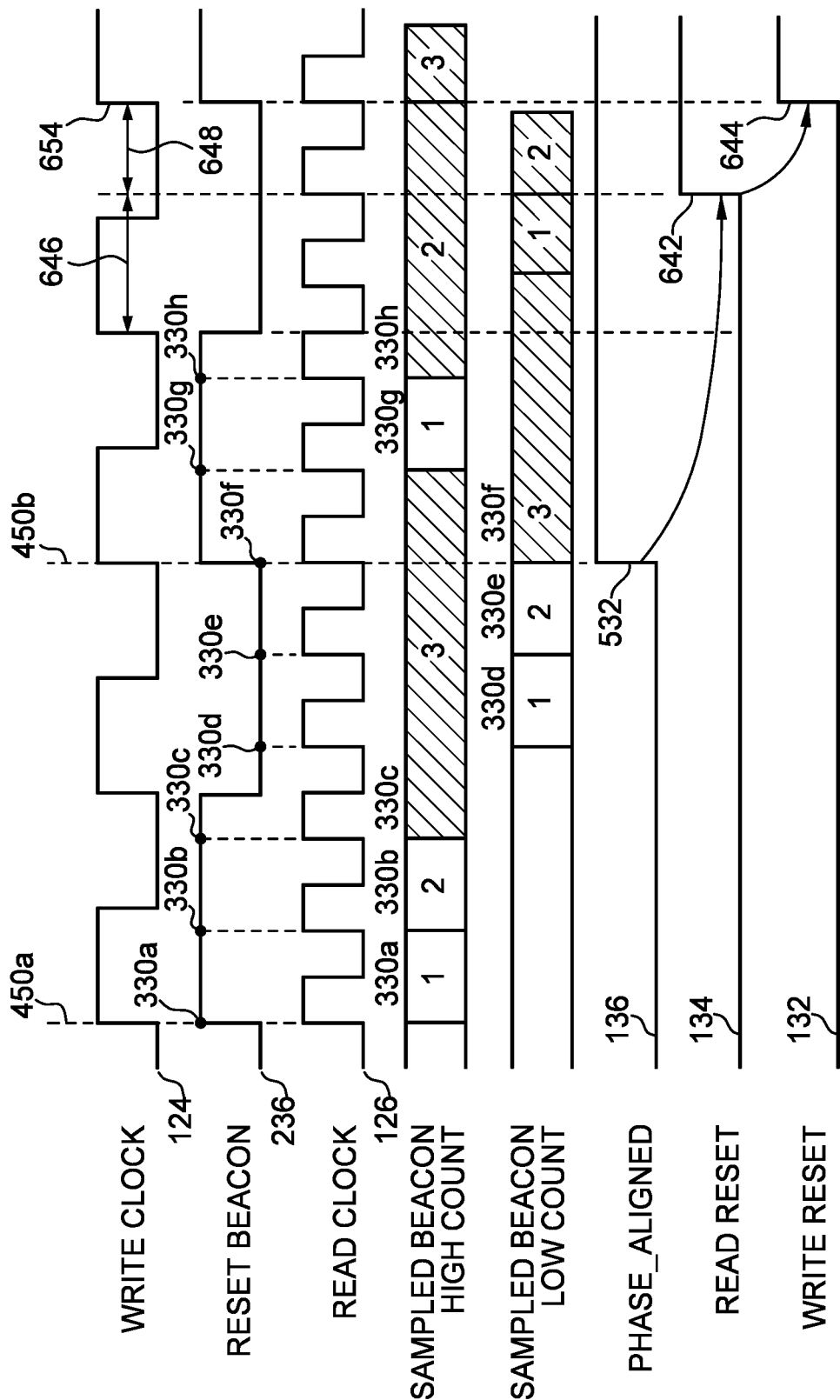
FIG. 6 illustrates a schematic timing diagram of an alternate method for FIFO write and read reset de-assertions, according to an example.

Referring to FIG. 6, depicted is a schematic timing diagram of an alternate method for FIFO write and read reset de-assertions, according to an example. In the example depicted in FIG. 5, de-assertion of the write reset 132 was followed by de-assertion of the read reset 134. Alternatively, the read reset 134 may be de-asserted first and then synchronized to a rising edge of the write clock 124 to generate the write reset 132 in such a way that better "setup/hold" time margins may be achieved. Once the desired phase alignment of the read and write clocks 126 and 124 is achieved, the read reset 134 may be de-asserted at a particular time following alignment of the write and read clocks, e.g., at time 642, four read clock cycles following the alignment point. The de-assertion of write reset 132 occurs at the following rising write clock 124. The resulting setup and hold windows for transition 642 with respect to the write clock 124 are nominally 1 and 1½ read clock cycles, compared to ½ read clock cycle in FIG. 5. Read and write resets are shown "active low" (de-assertion of resets "active high") but can also be "active high" for resets (de-assertion of resets "active low") and are contemplated herein.

A control signal "phase aligned" 136 may be asserted when both of the sampled beacon high and low counts are equal (3,3). The read reset 134 is de-asserted at a fixed interval following the alignment of rising clock edges at 450b, which is concurrent with the assertion of the phase aligned 136 control signal. The size of the fixed interval is selected such that the setup window 648 and hold window 646 are suitably large. In this example, the de-assertion 642 of the read reset 134 occurs four read clock cycles after the assertion 532 of the phase aligned 136 signal. The object is to choose a read clock 126 rising edge with good separation 646, 648 from the adjacent write clock 124 rising edges. This can be determined as a fixed interval following the clock alignment point 450b, dependent on the relative frequencies of write clock 124 and read clock 126.

Figure 7:
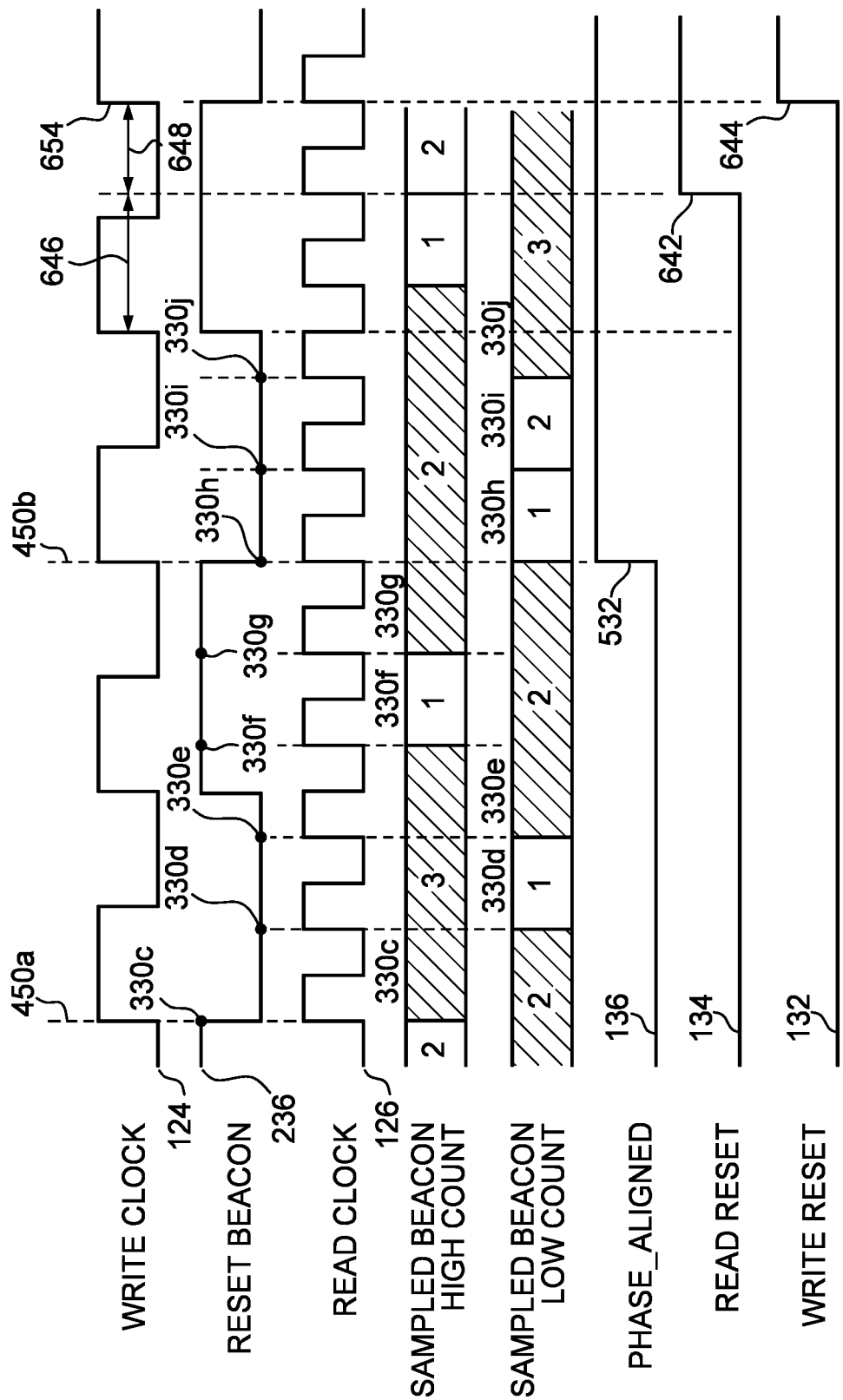
FIG. 7 illustrates a schematic timing diagram of another alternate method for FIFO write and read reset de-assertions, according to an example.

Referring to FIG. 7, depicted is a scenario similar to that of FIG. 6, wherein the beacon high and low counts become equal (2,2) instead of (3,3). Following the high sample at 330g, it is seen that the beacon high and low counts are equal. However, it is not immediately apparent that this indicates known clock alignment, because possibly the high count could become 3 at 330h, so that the actual counts are (3,2) rather than (2,2). This is in fact what happens after sample 330c at the left edge of FIG. 7, where the sample counts change from (2,2) to (3,2). Therefore, detection of (2,2) is not possible until the low sample is detected at 330h. The "phase aligned" signal 136 is asserted as the low sample is detected at 330h. As shown in FIG. 7, the de-assertion of read reset 134 is timed to occur at time 642, four read clock cycles after the detected alignment of rising write clock 124 and rising read clock 126.

Figure 8:
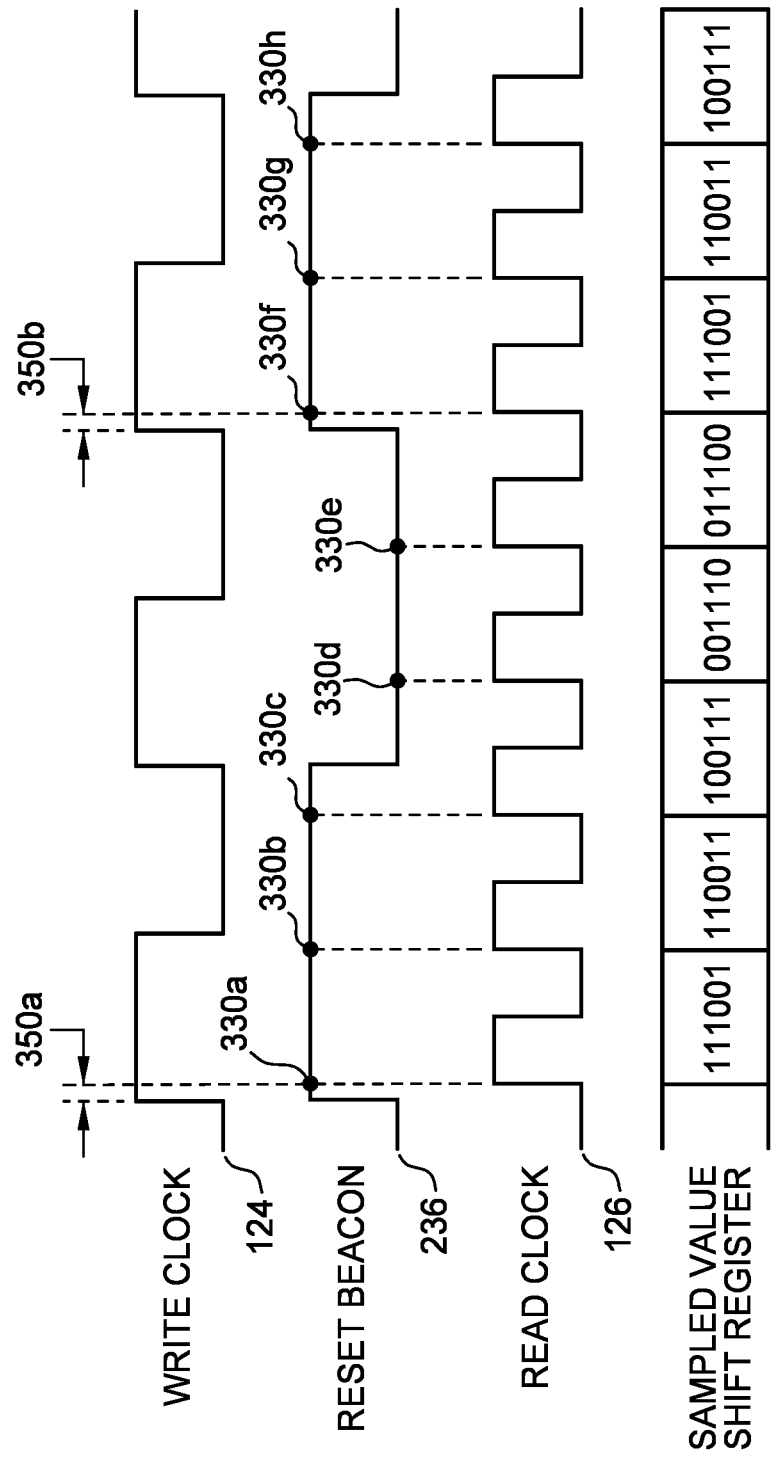
FIG. 8 illustrates a schematic timing diagram of a meta-stable state where the read and write clock rising edges are not aligned, according to an example.

Referring to FIG. 8, depicted is a schematic timing diagram of a state where the read and write clock rising edges are not aligned, according to an example. Sample 330 values of the reset beacon waveform 236 logic levels may be shifted through a six-bit shift register. In FIG. 8, the sampled beacon values 330 are shifted into the LSB (right end) of the shift register. Metastability is detected when the first (MSB) and last (LSB) bits in the shift register disagree. The waveform diagram of FIG. 8 shows recurring sample 330 values being three (3) sample 330 values at logic highs (e.g., 330a, 330b, 330c) and two sample 330 values at logic lows (e.g., 330d, 330e). Therefore, the six-bit MSB and LSB logic levels going through the shift register will always be the same. Thus, no metastability (caused by alignment of write clock 124 and read clock 126) is detected.

Referring to FIG. 9, depicted is a schematic timing diagram of a metastable state where the read and write clock rising edges are aligned, according to an example. As a result of the variable sampled beacon value when the clock edges are closely aligned, the logic levels of the MSB and LSB in the six-bit shift register will not always be the same. The sample 330 MSB, LSB logic level values in the shift register of bit pattern 840 do not match, so metastability is detected in this shifted bit pattern 840 case. Note the samples 330a and 330f are very close to changes in the logic levels (edges) of the reset beacon 236. So, detection of the logic levels of these samples could go either way, e.g., high or low. To achieve alignment of the two clocks, the phase and reset controller 106 (FIG. 1) adjusts the phase of the read clock 126 until a mismatch between the most significant bit (MSB) and the least significant bit (LSB) is detected, as shown in the register bit pattern 840 of FIG. 9. Preferably, after each phase adjustment, the logic should allow time for the shift register to be completely filled with new beacon sample values, so that a potential mismatch may be found wherever it may occur. Depending on the circuit characteristics such as the size of phase adjustments by the controller 106 and jitter, a mismatch between the shift register MSB and LSB may occur intermittently for a particular phase setting, or the mismatch may be observed just once after a phase change, indicating that the metastable phase alignment has been passed. In this latter case, it may be considered that phase alignment has been found (to within the possible alignment precision).

When the phase and reset controller detects a mismatch, it may assert the phase aligned signal 136. This marks a time when the write clock 124 and read clock 126 rising edges are aligned. As in the case where alignment is found using the "high count" and "low count" (FIG. 6), an appropriate time to de-assert the read reset 134 may be found as a fixed number of read clock cycles after the time of clock alignment. It may happen that multiple such times are suitable. FIG. 9 shows two possible times for de-assertion of read reset 134 that result in good setup and hold windows for copying the de-asserted reset from the read clock domain to the write clock domain. One possible choice is read reset de-assertion at time 842, followed by write reset de-assertion at time 844. This results in setup window 848 of 1½ cycles of read clock 126 and hold window 846 of 1 read clock cycle. A second choice is read reset de-assertion at time 862, followed by write reset de-assertion at time 864, indicated by dashed lines in FIG. 9. This results in setup window 868 of 1 read clock cycle and hold window 866 of 1½ read clock cycles. Other choices may be deemed satisfactory. A read clock count may be used to delay the read reset 134 de-assertion until the desired time. The choice of timing of the read reset de-assertion may be made programmable.

As will be appreciated by one skilled in the art and having the benefit of this disclosure, the embodiments disclosed herein may be embodied as a system, method, apparatus, or computer program product. Accordingly, aspects may take the form of an entirely hardware embodiment, an entirely software embodiment (including firmware, resident software, micro-code, etc.) or an embodiment combining software and hardware aspects. Furthermore, aspects may take the form of a computer program product embodied in one or more computer readable medium(s) having computer readable program code embodied thereon.

While the foregoing is directed to embodiments of the present invention, other and further embodiments of the invention may be devised without departing from the basic scope thereof, and the scope thereof is determined by the claims that follow.

What is claimed is:

1. A method for deterministic de-assertion of write and read resets of an asynchronous gearbox FIFO having unequal write and read data bit widths, comprising:
providing first and second clocks that are harmonically related in frequency, the first clock having a first clock frequency and the second clock having a second clock frequency;
deriving a reset beacon waveform from the first clock;
deriving a third clock from the second clock, the third clock having a third clock frequency;
sampling first and second logic levels of the reset beacon waveform at the third clock frequency, while adjusting a phase of the third clock frequency;
observing cyclical behavior of the sampled first and second logic levels of the reset beacon waveform; and
if a change in the cyclical behavior of the sampled first and second logic levels of the reset beacon waveform is detected, then de-asserting a write reset and a read reset.

2. The method of claim 1, wherein the write reset is de-asserted after a first interval and the read reset is de-asserted after a second interval.

3. The method of claim 1, wherein the read reset is de-asserted after a first interval and the write reset is de-asserted after a second interval.

4. The method of claim 2, wherein the write and read resets are de-asserted when an equal number of the first and second logic levels are sampled during one cycle of the reset beacon waveform.

5. The method of claim 3, wherein the write and read resets are de-asserted when an equal number of first and second logic levels are sampled during one cycle of the reset beacon waveform.

6. The method of claim 1, wherein the first logic level is a logic low, and the second logic level is a logic high.

7. The method of claim 1, wherein the first logic level is a logic high, and the second logic level is a logic low.

8. The method of claim 1, wherein the write data bit width is M, the read data bit width is N, M is greater than N, the second clock frequency is M divided by N times the first clock frequency and a frequency of the reset beacon waveform is one-half of the first clock frequency.

9. The method of claim 1, wherein the read data bit width is M, the write data bit width is N, M is less than N, the second clock frequency is N divided by M times the first clock frequency and a frequency of the reset beacon waveform is one-half of the first clock frequency.

10. A method for deterministic de-assertion of write and read resets of an asynchronous gearbox FIFO having unequal write and read data bit widths, comprising:

providing first and second clocks that are harmonically related in frequency, the first clock having a first clock frequency and the second clock having a second clock frequency;

deriving a reset beacon waveform from the first clock;

deriving a third clock from the second clock, the third clock having a third clock frequency;

sampling first and second logic levels of the reset beacon waveform at the third clock frequency, while adjusting a phase of the third clock frequency; and shifting the sampled first and second logic levels of the reset beacon waveform through an S-bit shift register.

11. The method of claim 10, wherein the write reset is de-asserted when a most significant bit and a least significant bit of a S-bit shift register word are at different logic levels, and then the read reset is de-asserted after the write reset is de-asserted.

12. The method of claim 10, wherein the read reset is de-asserted when a most significant bit and a least significant bit of a S-bit shift register word are at different logic levels, and then the write reset is de-asserted after the read reset is de-asserted.

13. The method of claim 10, wherein the first logic level is a logic low, and the second logic level is a logic high.

14. The method of claim 10, wherein the first logic level is a logic high, and the second logic level is a logic low.

15. The method of claim 10, wherein the write data bit width is M, the read data bit width is N, M is greater than N, the second clock frequency is M divided by N times the first clock frequency, and a bit length of the S-bit shift register word is M divided by N times two plus one (1).

16. The method of claim 10, wherein the write data bit width is M, the read data bit width is N, M is less than N, the second clock frequency is N divided by M times the first clock frequency and a bit length of the S-bit shift register word is N divided by M times two plus one (1).

17. The method of claim 10, further comprising if a most significant bit and a least significant bit of the S-bit shift register are not at different logic levels, then:

adjusting the phase of the third clock frequency;

sampling the first and second logic levels of the reset beacon waveform; and shifting the sampled first and second logic level values into the S-bit shift register.

18. An apparatus for deterministic reset of an asynchronous gearbox first-in first-out (FIFO), comprising:

integrated circuitry configured to:

provide first and second clocks that are harmonically related in frequency, the first clock having a first clock frequency and the second clock having a second clock frequency;

derive a reset beacon waveform from the first clock;

derive a third clock from the second clock, the third clock having a third clock frequency;

sample first and second logic levels of the reset beacon waveform at the third clock frequency, while adjusting a phase of the third clock frequency;

observe cyclical behavior of the sampled first and second logic levels of the reset beacon waveform; and if a change in the cyclical behavior of the sampled first and second logic levels of the reset beacon waveform is detected, then de-assert a write reset and a read reset.

* * * * *